United States Patent
Naito

(10) Patent No.: US 12,384,079 B2
(45) Date of Patent: Aug. 12, 2025

(54) PATTERN-FORMED OBJECT, INJECTION MOLDED OBJECT, AND METHOD OF MANUFACTURING INJECTION MOLDED OBJECT

(71) Applicant: NAITO PROCESS SCREEN PRINTING INC., Kawaguchi (JP)

(72) Inventor: Masakazu Naito, Kawaguchi (JP)

(73) Assignee: NAITO PROCESS SCREEN PRINTING INC., Kawaguchi (JP)

( * ) Notice: Subject to any disclaimer, the term of this patent is extended or adjusted under 35 U.S.C. 154(b) by 0 days.

(21) Appl. No.: 18/771,428

(22) Filed: Jul. 12, 2024

(65) Prior Publication Data
US 2025/0042071 A1 Feb. 6, 2025

(30) Foreign Application Priority Data
Aug. 3, 2023 (JP) .................. 2023-126955

(51) Int. Cl.
B29C 45/14 (2006.01)
B29C 45/16 (2006.01)
B29L 31/00 (2006.01)

(52) U.S. Cl.
CPC ...... B29C 45/1679 (2013.01); B29C 45/1418 (2013.01); B29K 2905/02 (2013.01); B29K 2905/12 (2013.01); B29K 2995/0097 (2013.01); B29L 2031/7224 (2013.01)

(58) Field of Classification Search
CPC . B29C 45/14; B29C 45/1418; B29C 45/1671; B29C 45/1679
See application file for complete search history.

(56) References Cited

U.S. PATENT DOCUMENTS

2011/0250309 A1  10/2011  Jeong et al.

FOREIGN PATENT DOCUMENTS

| JP | 2010260279 A | 11/2010 |
|----|---|---|
| JP | 5750747 B1 | 7/2015 |
| JP | 2021020681 A | 2/2021 |
| JP | 6994277 B1 | 1/2022 |
| JP | 2022-123957 A | 8/2022 |
| JP | 2023039619 A | 3/2023 |

(Continued)

OTHER PUBLICATIONS

Japanese Office Action from 2023-126955 dated Oct. 3, 2023, 10 pgs.

(Continued)

*Primary Examiner* — Thu Khanh T. Nguyen
(74) *Attorney, Agent, or Firm* — Tutunjian & Bitetto, P.C.

(57) ABSTRACT

A method of manufacturing an injection molded object includes preparing a flat metal sheet, fixing the metal sheet onto a mold for injection molding, clamping the mold, forming the injection molded object, and ejecting the injection molded object. The metal sheet have a first surface on which a pattern is formed, and a second surface opposite to the first surface. The metal sheet is fixed to the mold with the first surface facing a cavity of the mold. The mold is clamped. Molten plastic is injected inside the cavity. The metal sheet is plastically deformed from the pressure of the molten plastic and the pattern formed on the first surface is transferred onto a product surface. The injection molded object is ejected from the mold after the molten plastic solidifies, with the metal sheet remaining in the mold.

7 Claims, 4 Drawing Sheets

(56) References Cited

FOREIGN PATENT DOCUMENTS

JP         2023068963 A     5/2023
WO     2021/005920 A1    1/2021

OTHER PUBLICATIONS

Request for the Submission of an Opinion for KR 10-2024-0097406 dated Dec. 10, 2024. (11 pages).
Chinese Application No. 202410674713.X First Office Action dated Mar. 19, 2025.
Office Action from Korean Patent Application No. 10-2024-0097406 dated Jun. 16, 2025. (7 pages).

FIRST DIRECTION
THIRD DIRECTION
SECOND DIRECTION

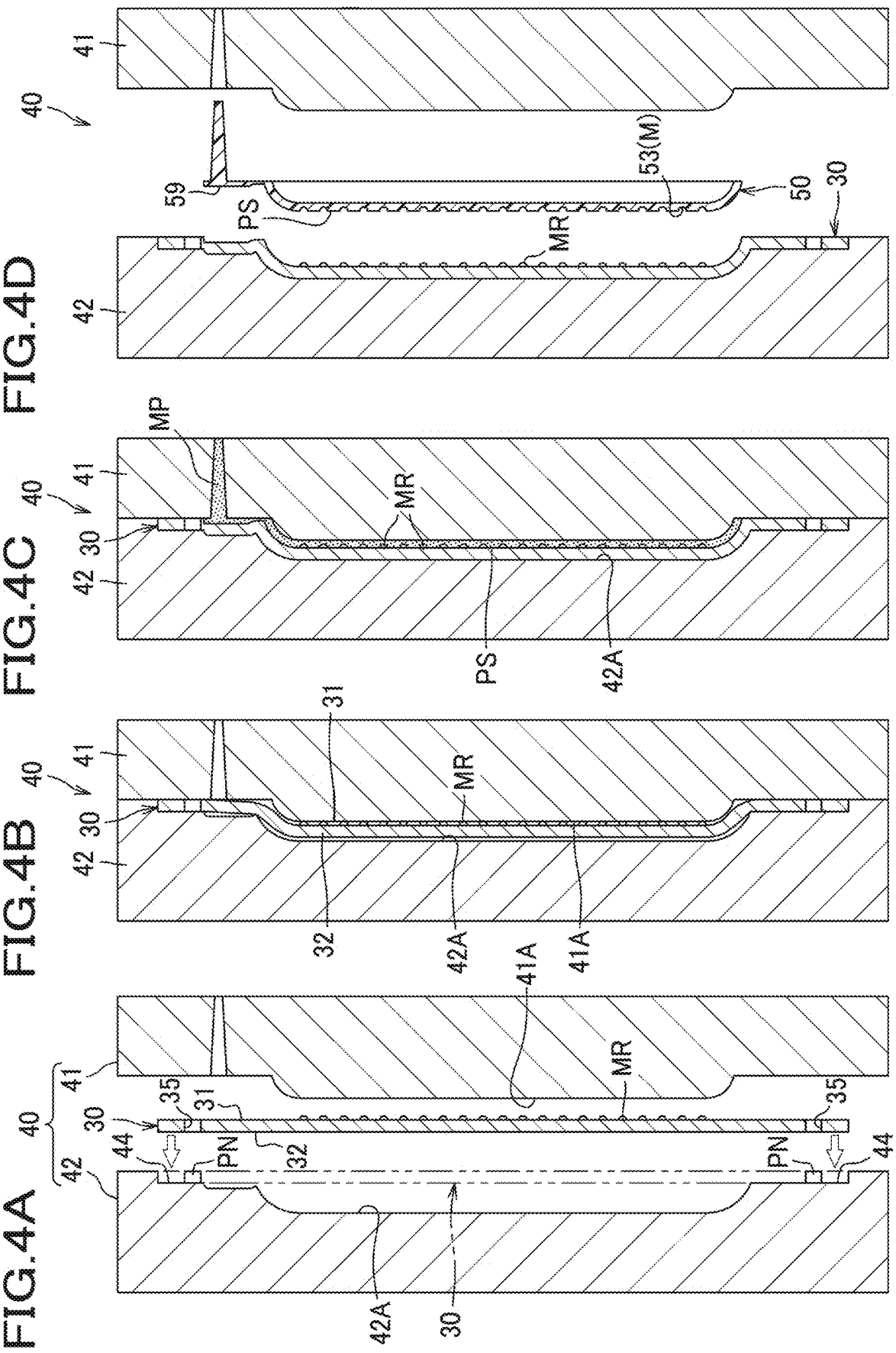

PATTERN-FORMED OBJECT, INJECTION MOLDED OBJECT, AND METHOD OF MANUFACTURING INJECTION MOLDED OBJECT

REFERENCE TO RELATED APPLICATIONS

This application claims priority from Japanese Patent Application No. 2023-126955 filed on Aug. 3, 2023. The entire contents of the priority application is incorporated herein by reference.

BACKGROUND ART

Conventionally, it is known to prepare a mold surface forming sheet, which is a plastic film on which patterns including fine lines with fine line pitches are formed by screen printing, and the mold surface forming sheet is disposed inside a mold to transfer the pattern onto a surface of an injection molded object. The mold surface forming sheet thermally deforms along the inner surface of the mold by heat during injection molding and is left in the mold such that it is affixed to the inner surface of the mold. Deep creases are formed on the mold surface forming sheet in parts where there is a change of shape of the mold such as at a boundary between a cavity and a parting line. There is a problem that the mold surface forming sheet becomes fragile at the deep creases and may cause the mold surface forming sheet to break.

On the other hand, the inventor of the present disclosure has invented a method of manufacturing an injection molded object in which a mold surface forming sheet made of elastomer, having a pattern formed by projections and depressions, is disposed inside a mold to transfer a pattern onto the surface of an injection molded object. In this method, the mold surface forming sheet made of elastomer has a higher elasticity and is not easily damaged compared to the conventional plastic film. Thus, durability is increased compared to the plastic film.

SUMMARY

In the above-described mold surface forming sheet, repetitive injection molding led to deep creases being formed in parts where there is a change of shape such as at a boundary between the cavity and the parting line, which may cause the mold surface forming sheet to break. Thus increasing durability of the mold surface forming sheet is desired.

Thus, it is an object of the present disclosure is to increase durability of a member for transferring patterns to the injection molded object.

A method for manufacturing an injection molded object according to the present disclosure comprises preparing a metal sheet, fixing the metal sheet onto a mold for injection molding, clamping the mold, forming the injection molded object, and ejecting the injection molded object.

In a step of preparing the metal sheet, a flat metal sheet is prepared. The metal sheet includes a first surface and a second surface opposite to the first surface. A pattern is formed on the first surface by projections and depressions.

In a step of fixing the metal sheet, the metal sheet is fixed onto a mold for the injection molding. Specifically, the metal sheet is fixed onto the mold with the first surface facing a cavity.

In a step of clamping the mold, the mold is clamped.

In a step of forming the injection molded object, molten plastic is injected inside the cavity, pressing a portion of the second surface against an inner surface of the mold such that the metal sheet is plastically deformed by pressure of the molten plastic. The pattern on the first surface is transferred onto a product surface of the molten plastic by the pressure of the molten plastic.

In a step of ejecting the injection molded object, after the molten plastic solidifies, the injection molded object is ejected from the mold, with the metal sheet remaining inside the mold.

Since the flat metal sheet is plastically deformed in the step of forming the injection molded object, after ejecting the injection molded object, the metal sheet is left inside the mold with the metal sheet closely contacting the inner surface of the mold. The metal sheet is not easily broken after the injection molded object is repeatedly manufactured. Thus, the durability of the member for transferring the pattern to the injection molded object can be increased.

In the step of preparing the metal sheet, a raised pattern may be formed on the first surface by printing.

In the step of preparing the metal sheet, the metal sheet may be treated by flame treatment or primer treatment, and then the pattern may be formed on the first surface by printing.

Since the first surface of the metal sheet is surface treated by flame treatment or primer treatment, the ink is less likely to come off from the first surface, so the frequency of replacing the metal sheet can be decreased.

The metal sheet may be made of aluminum or aluminum alloys.

In this instance, a thickness of the metal sheet may be equal to or greater than 0.05 mm and equal to or less than 2 mm.

Since the thickness of the metal sheet made of the aluminum or aluminum alloys is equal to or greater than 0.05 mm and equal to or less than 2 mm, the metal sheet can be plastically deformed to closely contact the inner surface of the mold.

The metal sheet may be made of sheet steel.

In this instance, a thickness of the metal sheet may be equal to greater than 0.01 mm and equal to or less than 0.7 mm.

Since the thickness of the metal sheet made of sheet steel is equal to or greater than 0.01 mm and equal to or less than 0.07 mm, the metal sheet can be plastically deformed to closely contact the inner surface of the mold.

In another aspect, the present disclosure is a pattern-formed object that is fit to be manufactured in the above-described method of manufacturing, or is fit to be used in the above-described method of manufacturing.

The pattern-formed object is an object on which an image is formed as a pattern, the image being a changing image changing according to an angle of observation.

The changing image includes a first pattern, a second pattern, and a third pattern. The first pattern consists of a plurality of line segments extending in a first direction. The second pattern consists of a plurality of line segments extending in a second direction different from the first direction. The third pattern consists of a plurality of line segments extending in a third direction different from the first direction and the second direction.

The first pattern consists of a plurality of pattern units. Each pattern unit consists of a pair of line segments having a same length. The pair of line segments are aligned side by side and located apart from each other by a distance d shorter than a length L of the line segment in a first width direction perpendicular to the first direction. A plurality of the pattern units of the first pattern is arranged in the first direction and a plurality of the pattern unit of the first pattern is arranged in the first width direction.

When one of two pattern units adjacent to each other in the first direction is designated as a first pattern unit and another of the two pattern units is designated as a second pattern unit, the second pattern unit is located apart from the first pattern unit in the first direction by a distance L1 shorter than the length L, and the second pattern unit is shifted from the first pattern unit in the first width direction by a distance d1 shorter than the distance d.

The second pattern may consist of a plurality of pattern units. Each pattern unit may consist of a pair of line segments having a same length. The pair of line segments may be aligned side by side and located apart from each other by the distance d in a second width direction perpendicular to the second direction. A plurality of the pattern units of the second pattern may be arranged in the second direction and a plurality of the pattern units of the second pattern may be arranged in the second width direction. One of two pattern units adjacent to each other may be designated as a third pattern unit and another of the two pattern units may be designated as a fourth pattern unit. The fourth pattern unit may be located apart from the third pattern unit in the second direction by the distance L1, and the fourth pattern unit may be shifted from the third pattern unit in the second width direction by the distance d1.

The pattern units forming the first pattern may be offset from each other by a distance L2 in the second direction. The pattern units forming the second pattern may be offset from each other by the distance L2 in the first direction. The two line segments forming the pattern unit of the first pattern may be located apart from each other by a distance D in the second direction. The two line segments forming the pattern unit of the second pattern may be located apart from each other by the distance D in the first direction. In an area in which the first pattern and the second pattern overlap, two line segments included in two adjacent pattern units of the first pattern which are adjacent to each other in the first width direction and two line segments included in two adjacent pattern units of the second pattern which are adjacent to each other in the second width direction may form a rhombus. A length of each side of the rhombus may be equal to length L2. A plurality of the rhombuses may be arranged apart from each other by the distance D in the first direction and a plurality of the rhombuses may be arranged apart from each other by the distance D in the second direction.

The third pattern may include a dashed line pattern in which line segments are aligned in a straight line and are located apart from each other in the third direction.

The pattern-formed object may be a metal sheet on which the changing image is formed by printing. Specifically, the pattern-formed object may be the metal sheet used in the above-described method of manufacturing. In this instance, the changing image as a pattern of the metal sheet is transferred onto the injection molded object.

BRIEF DESCRIPTION OF DRAWINGS

FIG. 4A is an illustration showing a step of injection molding, in which a metal sheet is fixed to a mold.

FIG. 4B is an illustration showing a step of injection molding, in which a mold is clamped.

FIG. 4C is an illustration showing a step of injection molding, in which molten plastic is injected into the mold.

FIG. 4D is an illustration showing a step of injection molding, in which the mold is opened and the injection molding is ejected.

DESCRIPTION

Figure 1A:
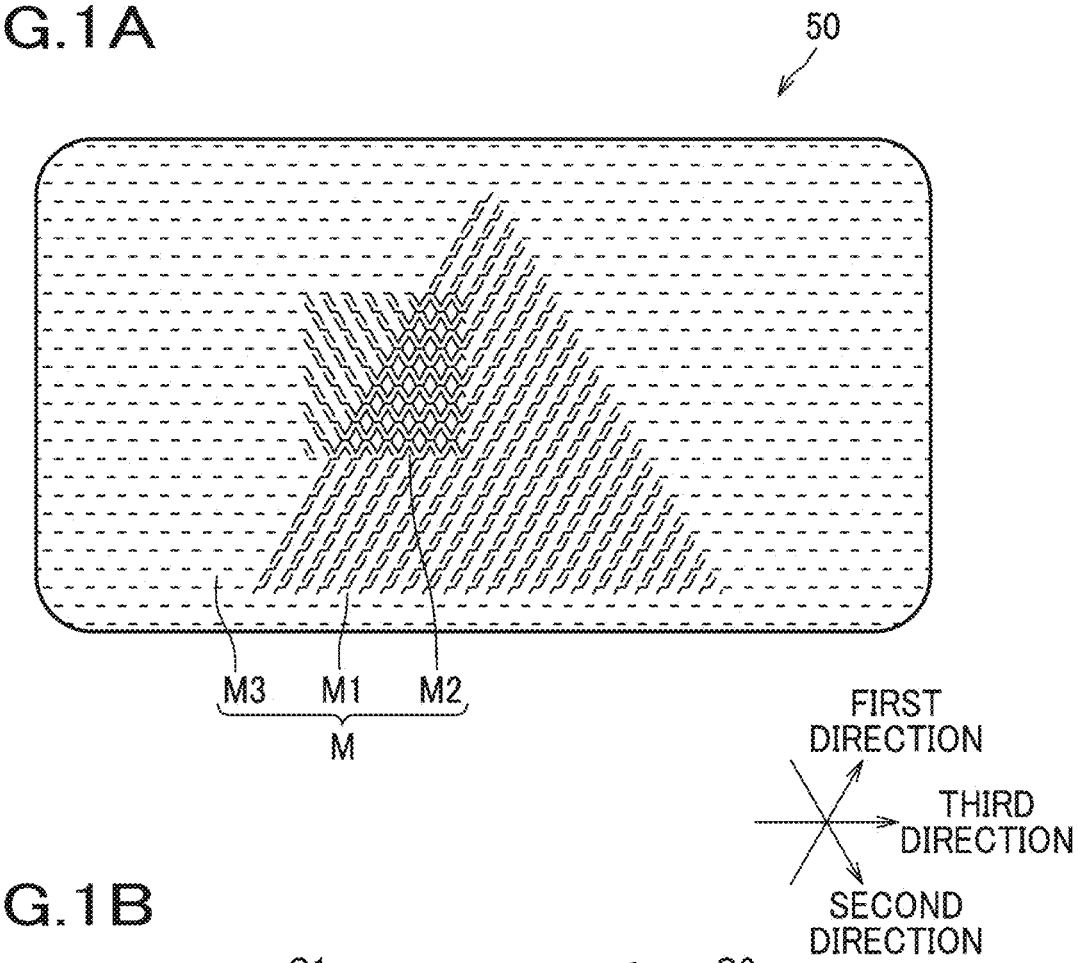
FIG. 1A is a front view of an injection molded object manufactured by the manufacturing method of the present disclosure.

Next, an embodiment of the present disclosure will be described in detail referring to the drawings where appropriate.

As shown in FIG. 1A, an injection molded object 50, as an example of an object on which a pattern is formed by a manufacturing method of the present disclosure, has a pattern M formed by projections and depressions on its surface. A surface of the injection molded object 50 on which the pattern M is formed is raised and a back side is recessed. The pattern M is formed by lines made by long depressions.

Figure 1B:
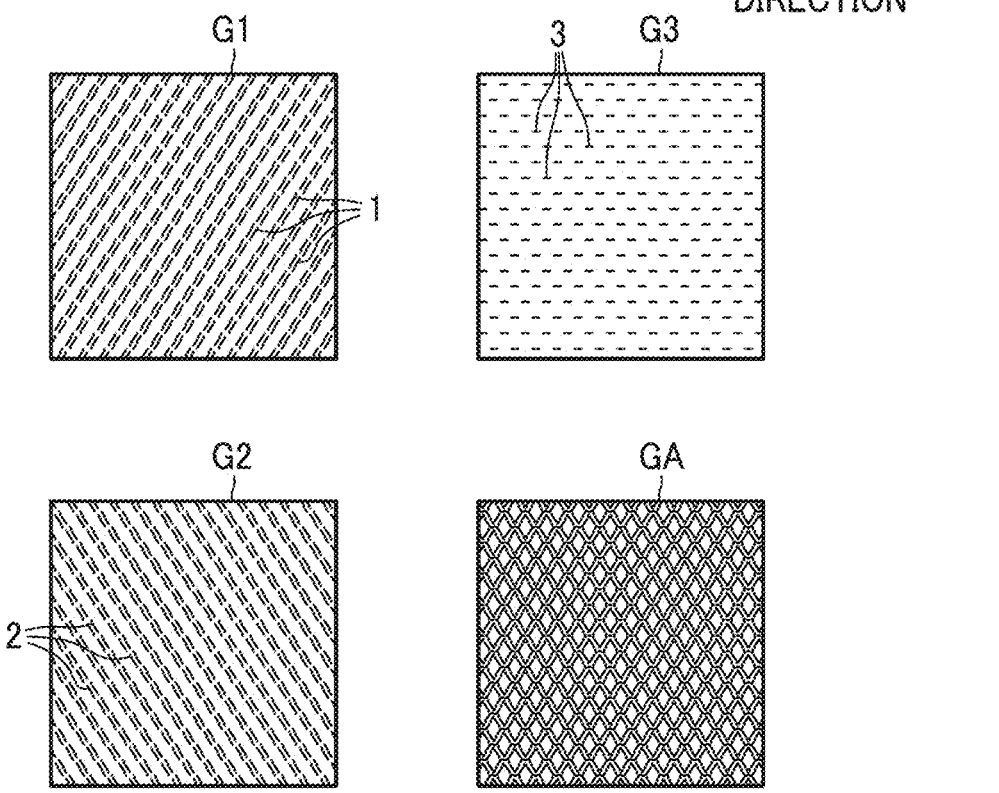
FIG. 1B is an illustration showing patterns forming the changing image of FIG. 1A and a pattern in which the patterns are overlapped with each other.

The pattern M changes according to an angle of observation. Such a pattern is hereinafter referred to as a "changing image." As shown in FIG. 1B, the changing image includes a first pattern G1, a second pattern G2, and a third pattern G3.

The first pattern G1 consists of a plurality of line segments 1 extending in a first direction.

The second pattern G2 consists of a plurality of line segments 2 extending in a second direction different from the first direction.

The third pattern G3 consists of a plurality of line segments 3 extending in a third direction different from the first direction and the second direction. In the present embodiment, an angle of the first direction relative to the third direction is equal to an angle of the second direction relative to the third direction.

As shown in FIG. 1A, the pattern M includes a triangular first image M1, a quadrangular second image M2, and a third image M3 that forms a background. The second image M2 overlaps the first image M1.

The third image M3 is formed by the third pattern G3. The first image M1 is formed by the first pattern G1 and overlaps the third image M3. The second image M2 is formed by the second pattern G2 and overlaps the first image M1 and the third image M3. A pattern GA (refer to FIG. 1B) is formed where the first image M1, the second image M2, and the third image M3 overlap each other. The first pattern G1, the second pattern G2, and the third pattern G3 overlap each other in the pattern GA.

Since the first image M1 includes the first pattern G1, the first image M1 is more visible from a predetermined direction in which the first pattern G1 has a higher reflectivity. Since the second image M2 includes the second pattern G2, the second image M2 is more visible from a direction different from the predetermined direction.

Figure 2A:
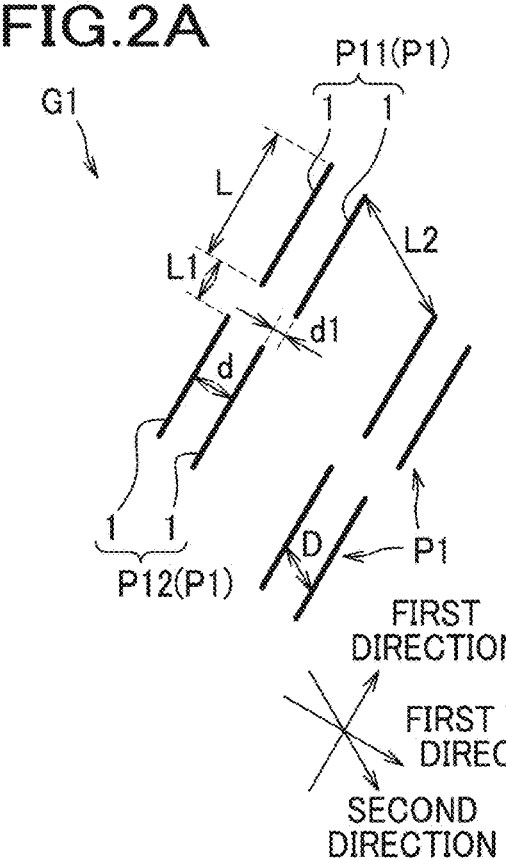
FIG. 2A is an enlarged view of a first pattern.

As shown in FIG. 2A, the first pattern G1 consists of a plurality of pattern units P1. A pattern unit P1 consists of a pair of line segments 1 having the same length. The pair of line segments 1 are aligned side by side and located apart from each other in a first width direction perpendicular to the first direction by a distance d that is equal to or shorter than a length L of the line segment 1. The line segments 1 of the pattern unit P1 are located apart from each other in the second direction by a distance D. A plurality of the pattern units P1 is arranged in the first direction and a plurality of the pattern units P1 is arranged in the first width direction.

When one of two pattern units P1 adjacent to each other in the first direction is designated as a first pattern unit P11, and the other is designated as a second pattern unit P12, the second pattern unit P12 is located apart from the first pattern unit P11 in the first direction by a distance L1 that is equal to or shorter than the length L, and the second pattern unit P12 is shifted from the first pattern unit P11 in the first width direction by a distance d1 that is shorter than the distance d. The pattern units P1 forming the first pattern G1 are offset from each other in the second direction by a distance L2.

In the present embodiment, the distance L2 is equal to the length L. The distance L2 may be shorter than the length L.

Figure 2C:
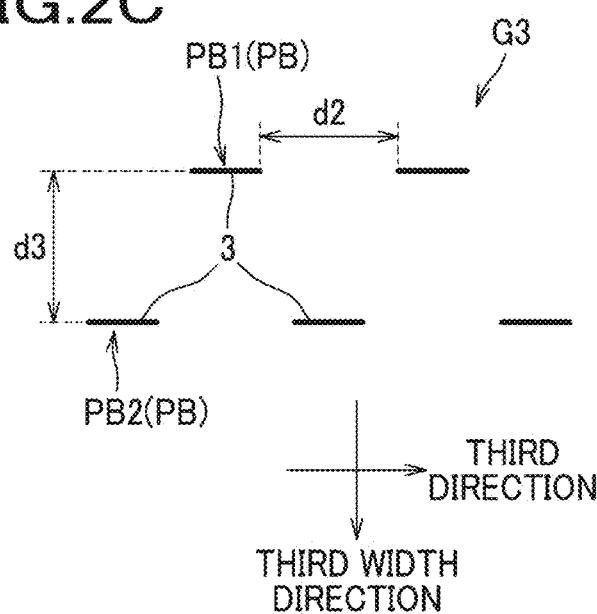
FIG. 2C is an enlarged view of a third pattern.
Figure 2B:
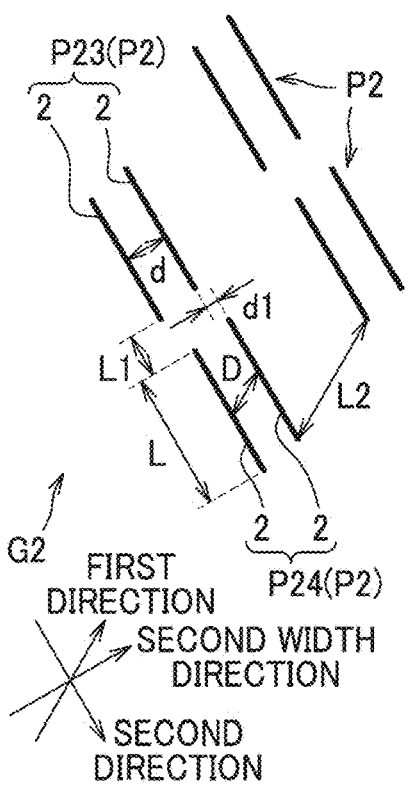
FIG. 2B is an enlarged view of a second pattern.

As shown in FIG. 2B, the second pattern G2 is arranged as a pattern in which the pattern unit P1 forming the first pattern G1 is reversed. Specifically, the second pattern G2 consists of a plurality of pattern units P2. A pattern unit P2 consists of a pair of line segments 2 having the same length. The length of the line segment 2 is equal to the length L of the line segment 1. The pair of line segments 2 are aligned side by side and located apart from each other in a second width direction perpendicular to the second direction by the distance d. The line segments 2 of the pattern unit P2 are located apart from each other in the first direction by the distance D. A plurality of the pattern units P2 is arranged in the second direction and a plurality of the pattern units P2 is arranged in the second width direction.

When one of two pattern units P2 adjacent to each other in the second direction is designated as a third pattern unit P23, and the other is designated as a fourth pattern unit P24, the fourth pattern unit P24 is located apart from the third pattern unit P23 in the second direction by a distance L1, and the fourth pattern unit P24 is shifted from the third pattern unit P23 in the second width direction by a distance d1. The pattern units P2 forming the first pattern G2 are offset from each other in the first direction by a distance L2.

Figure 2D:
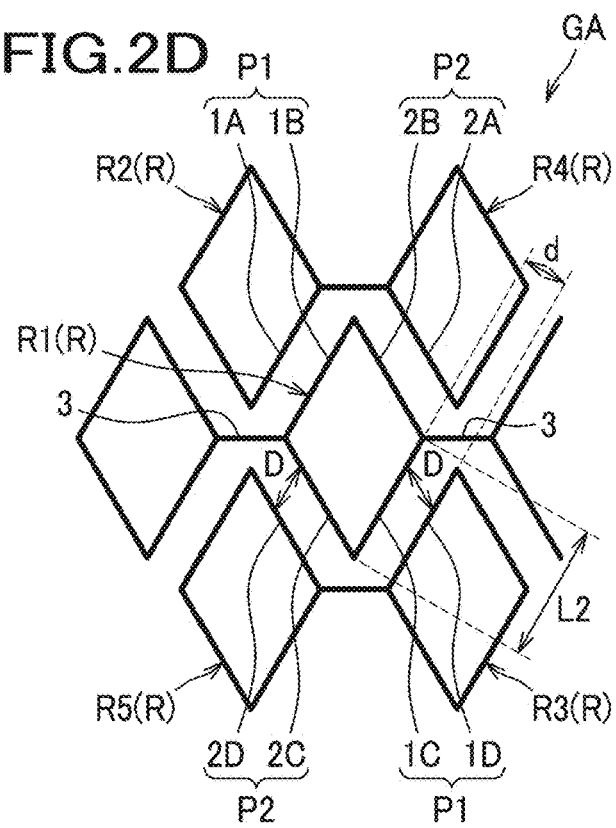
FIG. 2D is an enlarged view of a pattern in which the first pattern, the second pattern, and the third pattern are overlapped with each other.

As shown in FIG. 2D, in an area in which the first pattern G1 and the second pattern G2 overlap, two line segments 1B and 1C forming the first pattern G1 and two line segments 2B and 2C forming the second pattern G2 form a rhombus R. A length of each side of the rhombus R is equal to the distance L2. A plurality of rhombuses R is arranged in the first direction and a plurality of rhombuses R is arranged in the second direction. The rhombuses R are arranged apart from each other by the distance D in the first direction and the rhombuses R are arranged apart from each other by the distance D in the second direction. Two pattern units P1 adjacent to each other in the first width direction include four line segments 1A, 1B, 1C, and 1D. The two line segments 1B and 1C are the inner two line segments of the four line segments 1A, 1B, 1C and 1D. Two pattern units P2 adjacent to each other in the second width direction include four line segments 2A, 2B, 2C, and 2D. The two line segments 2B and 2C are the inner two line segments of the four line segments 2A, 2B, 2C and 2D.

The outer-side line segment 1A that is located to the upper-left (to one side in the first width direction) of the line segment 1B in FIG. 2D forms a rhombus R2 that is located to the upper-left in FIG. 2D of the rhombus R1 formed by the line segments 1B and 1C. The outer-side line segment 1D that is located to the lower-right (to the other side in the first width direction) of the line segment 1C in FIG. 2D forms a rhombus R3 that is located to the lower-right in FIG. 2D of the rhombus R1 formed by the line segments 1B and 1C.

The outer-side line segment 2A that is located to the upper-right (to one side in the second width direction) of the line segment 2B in FIG. 2D forms a rhombus R4 that is located to the upper-right in FIG. 2D of the rhombus R1 formed by the line segments 2B and 2C. The outer-side line segment 2D that is located to the lower-left (to the other side in the second width direction) of the line segment 2C in FIG. 2D forms a rhombus R5 to the lower-left in FIG. 2D of the rhombus R1 formed by the line segments 2B and 2C.

As shown in FIG. 2C, the third pattern G3 consists of a plurality of dashed line patterns PB in which line segments 3 are aligned in a straight line and located apart from each other by a distance d2 in the third direction. The dashed line patterns PB are aligned side by side and are located apart in a third width direction perpendicular to the third direction by a distance d3 longer than the distance d2. When one of the two dashed line patterns PB adjacent to each other in the third width direction is designated as a first dashed line pattern PB1 and the other is designated as a second dashed line pattern PB2, each of the line segments 3 forming the second dashed line pattern PB2 is out of alignment with the line segments 3 forming the first dashed line pattern PB1 in the third direction. Specifically, the first dashed line pattern PB1 and the second dashed line pattern PB2 are arranged so that a line segment 3 forming the second dashed line pattern PB2 is located between two line segments 3 forming the first dashed line pattern PB1 in the third direction.

The line segments 3 of the third pattern G3 are located in positions that connect adjacent apexes of two adjacent rhombuses R. Specifically, the distance d2 is equal to a length of the shorter diagonal of the rhombus R. The distance d3 is longer than half the length of the longer diagonal of the rhombus R.

A method of manufacturing the injection molded object 50 will be described below.

Figure 3:
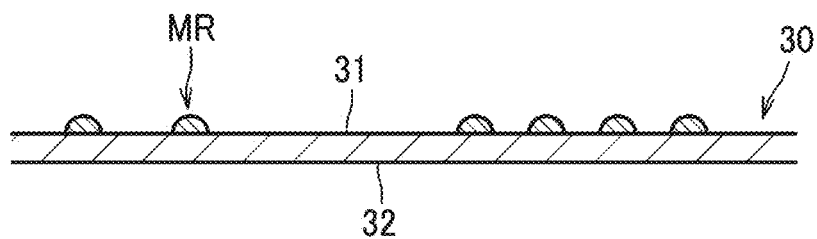
FIG. 3 is a partial enlarged cross-sectional view of a metal sheet on which the pattern is printed.

In the manufacturing method of the present embodiment, first, as shown in FIG. 3, a flat metal sheet 30 on which a pattern MR is formed by projections and depressions is prepared (metal sheet preparing step). Herein, the pattern MR is a pattern in which the projections and depressions of the above-described pattern M are reversed. The metal sheet 30 has a first surface 31 and a second surface 32 opposite to the first surface 31.

In the metal sheet preparing step, first, the first surface 31 of the metal sheet 30 is treated by flame treatment or primer treatment. Next, a raised pattern MR is formed on the first surface 31 of the metal sheet 30 by printing. In this instance, screen printing or inkjet printing may be used as a method for printing. Ink used for printing is an ultraviolet-curable ink. After the ink is applied to the first surface 31 of the metal sheet 30, ultraviolet light may be shone on the ink to quickly complete the raised printing. Alternatively, thermography may be used, in which resinous powder is applied to ink, which is normal ink, before the ink dries and the resinous powder is fused and fixed. The dimension of the projections and depressions forming the pattern MR in the direction of thickness of the metal sheet 30 is smaller than a thickness of the metal sheet 30.

The material of the metal sheet 30 is not limited so long as ink may be fixed, but, for example, aluminum, aluminum alloys, and sheet steel such as galvanized sheet steel and stainless sheet steel may be used. When the metal sheet 30 is made of aluminum or aluminum alloys, the thickness of the metal sheet 30 may be equal to or greater than 0.05 mm and equal to or less than 2 mm. When the metal sheet 30 is made of sheet steel, the thickness of the metal sheet 30 may be equal to or greater than 0.01 mm and equal to or less than 0.7 mm.

As shown in FIG. 4A, after preparing the metal sheet 30, the metal sheet 30 is fixed to an injection mold 40 having a recessed inner surface 42A, with the second surface 32 facing the inner surface 42A of the mold 40 and the first surface 31 facing a cavity of the mold 40 (fixing step).

Specifically, in one example, the mold 40 includes a fixed mold 41 and a movable mold 42, and the movable mold 42 has the recessed inner surface 42A. The fixed mold 41 has a raised inner surface 41A corresponding to the recessed inner surface 42A. Either one of the fixed mold 41 or the movable mold 42 may have the recessed inner surface 42A. The movable mold 42 may have a pin PN for fixing the metal sheet 30. In this instance, a hole 35 that engages the pin PN may be formed in the metal sheet 30.

When fixing the metal sheet 30 to the mold 40, the metal sheet 30 is preferably, but not necessarily, fixed to a flat portion 44 located outside of the recessed inner surface 42A. When fixing the metal sheet 30 to the mold 40, an adhesive or a double-sided tape may be used. In the state the metal sheet 30 is fixed to the mold 40, the metal sheet 30 does not closely contact the recessed inner surface 42A just by being fixed to the moving mold 42 since the metal sheet 30 is a flat sheet (refer to the phantom line).

As shown in FIG. 4B, when the mold 40 is clamped (clamping step), the metal sheet 30 is lengthened by being pushed by the protruding inner surface 41A, but does not totally contact the recessed inner surface 42A. In the mold 40 of the present embodiment, the cavity in which the material is to be filled is the space between the metal sheet 30 and the raised inner surface 41A (the space in which molten plastic MP is to be filled in the subsequent forming step).

As shown in FIG. 4C, molten plastic MP is injected into the cavity and the pressure of the molten plastic MP plastically deforms the metal sheet 30. The second surface 32 is pressed against the recessed inner surface 42A of the mold 40, and the pattern MR of the first surface 31 is transferred onto a product surface PS of the molten plastic MP (forming step).

Next, as shown in FIG. 4D, after the molten plastic MP solidifies, the injection molded object 50 is removed with the metal sheet 30 left in the mold 40 (ejecting step). If a runner 59 or the like is left on the injection molded object 50, the runner 59 is removed. The projections and depressions of the first surface 31 of the metal sheet 30 are transferred onto the surface of the injection molded object 50, and the pattern M is formed. The pattern M is a pattern formed by the depressions 53.

After the first injection molded object 50 is manufactured by the mold 40, the plastically deformed metal sheet 30 is left in the moving mold 42 with the metal sheet 30 closely contacting the inner surface 42A of the moving mold 42. Therefore, when a second and subsequent injection molded objects 50 are manufactured, the injection molding can be performed using the metal sheet 30 closely contacting the inner surface 42A.

According to the above-described method for manufacturing the injection molded object of the present embodiment, the following advantageous effects can be obtained.

Since the flat metal sheet 30 is plastically deformed in the forming step, even after the injection molded object is ejected, the metal sheet 30 is left inside the moving mold 42 with the metal sheet 30 fitting the inner surface 42A of the moving mold 42. The metal sheet 30 is not easily broken after the injection molded object 50 is repeatedly manufactured. Thus, the durability of the member for transferring the pattern to the injection molded object can be increased.

Since the first surface 31 of the metal sheet 30 is surface treated by flame treatment or primer treatment, the ink is less likely to come off from the first surface 31, so the frequency of replacing the metal sheet can be decreased.

By forming the metal sheet 30 made of aluminum or aluminum alloys with a thickness equal to or greater than 0.05 mm, problems such as the metal sheet 30 cracking when the metal sheet 30 is plastically deformed can be restrained. Likewise, forming the metal sheet 30 made of aluminum or aluminum alloy with a thickness equal to or less than 2 mm, the metal sheet 30 can be plastically deformed by the pressure of the molten plastic MP until the metal sheet 30 closely contacts the inner surface 42A of the moving mold 42.

By forming the metal sheet 30 made of sheet steel with a thickness greater than or equal to 0.01 mm, problems such as the metal sheet 30 cracking when the metal sheet 30 is plastically deformed can be restrained. Likewise, by forming the metal sheet 30 made of sheet steel with a thickness equal to or less than 0.7 mm, the metal sheet 30 can be plastically deformed by the pressure of the molten plastic MP until the metal sheet 30 closely contacts the inner surface 42A of the moving mold 42.

Although an embodiment of the present invention has been described above, the present invention is not limited to the above-described embodiment and may be modified and implemented in various forms.

For example, in the above-described embodiment, the projections and depressions are formed on the metal sheet 30 by printing. However, in the metal sheet preparing step, the projections and depressions may be formed on the first surface of the metal sheet by laser engraving, machining, or work of a craftsman.

Further, the metal sheet may be made by another person.

The pattern is not limited to a changing image, and may be any pattern.

If a first mold, of the first mold and the second mold constituting the mold, having the recessed inner surface has the inlet for injecting the molten plastic, the metal sheet may be placed in the mold with the first surface of the metal sheet facing the recessed inner surface of the first mold. In this instance, when the molten plastic is injected, the second surface of the metal sheet is pressed against the raised inner surface of the second mold.

To form the image consisting of a plurality of rhombuses arranged apart from each other by the distance D in the first direction and a plurality of rhombuses arranged apart from each other by the distance D in the second direction, the second pattern unit may not be shifted in the first width direction relative to the first pattern unit. In other words, the second pattern unit and the first pattern unit may be aligned in line and located apart from each other in the first direction. The same can be said about the third pattern unit and the fourth pattern unit. When the first pattern unit and the second pattern unit is shifted in the first width direction as in the above-described embodiment, the space between two rhombuses adjacent in a longitudinal direction of the rhombuses may be made smaller.

The elements described in the above embodiment and its modified examples may be implemented selectively and in combination.

What is claimed is:

1. A method of manufacturing an injection molded object, the method comprising:

preparing a flat metal sheet having a first surface and a second surface opposite to the first surface, the first surface having a pattern thereon formed by projections and depressions;

fixing the metal sheet onto a mold for injection molding with the first surface of the metal sheet facing a cavity of the mold and a space provided between a portion of the second surface and a bottom of an inner surface of the mold;

clamping the mold;

forming the injection molded object by injecting molten plastic into the cavity, pressing the portion of the second surface against the bottom of the inner surface of the mold by pressure of the molten plastic, such that the metal sheet is plastically deformed to be in close contact with the inner surface of the mold, and transferring the pattern formed on the first surface onto a product surface of the molten plastic; and ejecting the injection molded object after the molten plastic solidifies, with the metal sheet remaining in close contact with the inner surface of the mold.

2. The method of manufacturing the injection molded object according to claim 1, wherein preparing the metal sheet comprises forming a raised pattern on the first surface by printing.

3. The method for manufacturing the injection molded object according to claim 2, wherein preparing the metal sheet comprises treating the first surface by flame treatment or primer treatment, and then forming the pattern on the first surface by printing.

4. The method of manufacturing the injection molded object according to claim 1, wherein the metal sheet is made of aluminum or aluminum alloys.

5. The method of manufacturing the injection molded object according to claim 4, wherein a thickness of the metal sheet is equal to or greater than 0.05 mm and equal to or less than 2 mm.

6. The method of manufacturing the injection molded object according to claim 1, wherein the metal sheet is made of sheet steel.

7. The method of manufacturing the injection molded object according to claim 6, wherein a thickness of the metal sheet is equal to or greater than 0.01 mm and equal to or less than 0.7 mm.

* * * * *